Patented Dec. 25, 1945

2,391,798

UNITED STATES PATENT OFFICE 2,391,798

ALKYL PHENOL COMPOSITIONS

Roland R. Read, Kirkwood, Mo., assignor to Sharp & Dohme, Incorporated, Philadelphia, Pa., a corporation of Maryland No Drawing. Original application October 10, 1932, Serial No. 673,199. Divided and this application January 18, 1940, Serial No. 314,473

2 Claims. (Cl. 167—31)

This application relates to alkyl phenols. It includes new methods of preparing these compounds and new products including both new alkyl phenols and antiseptic preparations containing alkyl phenols.

I have found it advantageous to prepare alkyl phenols by condensing an alcohol with a phenol in an acid solution. I find, for example, that alkyl phenols can be produced by condensing alcohols with phenols in a sulphuric acid solution. Moreover, I find that by condensing alcohols with phenols in the presence of zinc chloride, it is advantageous to employ an acid such as hydrochloric acid and that in the presence of this acid, a lower condensation temperature is required, for example, a temperature of about 120 to 135°, a much smaller amount of zinc chloride is consumed and improved yields are obtained as compared with the condensation of alcohols with phenols in the presence of zinc chloride but not in acid solution. On condensing the zinc chloride in solutions of acids other than hydrochloric, hydrochloric acid is no doubt formed by reaction on the zinc chloride. The use of zinc chloride as a condensing agent in the presence of hydrochloric acid is of particular value in preparing secondary and tertiary alkyl phenols. By this process I find it possible to condense secondary amyl alcohol, which may contain pentanol-2 and pentanol-3, normal amyl alcohol, secondary butyl alcohol, secondary hexyl alcohol which may contain both hexanol-2 and hexanol-3, secondary heptyl alcohol, cyclo hexyl alcohol, tertiary amyl alcohol and tertiary butyl alcohol with phenol, cresols and guaiacol.

The invention includes as new products alkyl cresols, more particularly secondary amyl cresol, tertiary amyl cresol, secondary hexyl cresol, tertiary hexyl cresol and secondary butyl cresol, including alkyl ortho, para and meta isomers and mixtures thereof; also alkyl guaiacols, more particularly secondary butyl guaiacol, secondary amyl guaiacol, secondary hexyl guaiacol, tertiary hexyl guaiacol and cyclo hexyl guaiacol; and also secondary amyl phenol, secondary hexyl phenol and secondary heptyl phenol.

Mixtures of the cresols may be employed in the preparation of alkyl phenols according to the process of this invention, or the individual isomers may be condensed with alcohols to give secondary hexyl ortho cresol, secondary hexyl meta cresol, secondary hexyl para cresol, secondary amyl meta cresol, and secondary butyl meta cresol, for example, all of which are new products and a part of this invention.

Using zinc chloride as a condensing agent in a hydrochloric acid solution, there is a tendency for the phenol nucleus to attach itself to that carbon of the alcohol to which the greatest number of other groups are already attached, thus normal butyl alcohol gives secondary butyl phenol and both isobutyl alcohol and tertiary butyl alcohol give tertiary butyl phenol. Both pentanol-2 and pentanol-3 attach themselves to the ring in the ortho and para positions. Normal amyl alcohol gives a mixture containing both compounds in which the second and third carbons are occupied. Iso-amyl alcohol and tertiary amyl alcohol both give tertiary amyl phenol. The secondary heptyl phenol boiling between 255° and 275° C. obtained by the condensation of phenol with normal heptyl alcohol is undoubtedly a mixture of the ortho and para isomers in which the ring is connected to one of the intermediate carbons in the normal heptane chain. By distillation of the reaction mixtures, products are obtained, which are composed chiefly of the secondary alkyl phenols, although they may contain small amounts of other isomers, depending upon the purity of the starting materials and the reaction involved. For example, on condensing isopropyl alcohol with ortho cresol a mixture of compounds is obtained, the isopropyl group entering more than one of the available open positions. The same is true with meta-cresol, and thymol may be one of the products produced. The condensation product of isopropyl alcohol and meta-cresol with a melting point of 237.7°, previously reported, is undoubtedly also produced. A mixture of products is also obtained from para cresol. Starting with a mixture of the cresols a large number of compounds is obtained. In condensing an alcohol, such as normal amyl alcohol or normal hexyl alcohol with a mixture of the cresols, according to my process, a still larger number of compounds is produced because the ring does not always attach to the same carbon of the paraffin chain, but according to my process the products are composed chiefly of secondary amyl and hexyl cresols, respectively.

I have found that by using an excess of normal butyl alcohol with a limited amount of concentrated hydrochloric acid normal butyl alcohol will condense smoothly with phenol in the presence of zinc chloride to give a product consisting of a mixture of butyl phenols containing more of the para-isomer than the ortho isomer, but consisting chiefly of other constituents than para secondary butyl phenol, such a product having a boiling range for example of from 220–250° C., and having a phenol coefficient of around 37 to 40.

Without the use of hydrochloric acid, it has been customary in condensing alcohols with phenols using zinc chloride to heat the reaction mixture to temperatures at or near the boiling point of the mixtures which is usually 160° C. or above. I have found that by using hydrochloric acid solutions for the condensations, the temperatures may be materially reduced. For example, in the condensation of normal butyl alcohol with phenol, a temperature around 130° to 135° C. may be employed as compared with temperatures around 184° to 185° C. formerly employed for the condensation of these compounds without the use of an acid. The use of an excess of the alcohol, for example, normal butyl alcohol above that which enters into reaction with the phenol increases the yield of the alkyl phenol product based upon the phenol employed.

The invention will be further illustrated by the following specific examples, the parts being by weight:

Example 1

85 parts of phenol and 150 parts of zinc chloride are mixed and heated to 130°-140° C. with vigorous agitation under a reflux condenser. To this mixture is added during two hours a solution of fourteen parts of concentrated hydrochloric acid in 35 parts of normal butyl alcohol. A further addition of fourteen parts of concentrated hydrochloric acid in 105 parts of normal butyl alcohol is made over a period of six hours. Heating to the refluxing temperature is continued for a further period of three hours, the temperature being maintained at such a point that refluxing is vigorous. The oily reaction product separates from the aqueous layer. The oily reaction product is washed two or three times with water and is thus obtained as a crude reaction product. The excess alcohol and low boiling reaction products are removed by distillation until the temperature of the distillate reaches about 160° C.

For some purposes, as in the manufacture of certain antiseptic or disinfecting compositions, the crude reaction product can be employed without further purification, and without removal of any remaining phenol therefrom. This crude reaction product may contain some unchanged phenol and may also contain small amounts of tarry constituents. Its high phenol coefficient makes it a valuable crude product for use where a refined or purified product is not required. Its high phenol coefficient enables a small amount of it to be employed in place of much larger amounts, for example, of ordinary crude phenol.

The crude product can be further purified by subjecting it to distillation to remove first any unchanged phenol and then to distill the butyl phenol compositions over a boiling point range of, for example, from 220° C. up to around 255° or 265° C., leaving a tarry residue as the residue of the distillation. This product so obtained contains various constituents of both lower, intermediate and higher boiling point. A large part of the compositions is soluble in dilute alkali using, for example, 5% caustic soda solution. It is preferable to use an excess of the alkali solution, for example, around 70% in excess of that theoretically required. The residue remaining after such extraction with 5% caustic soda solution is to a considerable extent soluble in a stronger caustic soda solution, for example, a 10% caustic soda solution. The residue from the extraction with 5% caustic soda solution appears to be made up to a considerable extent of higher boiling phenols which appear as alkali insoluble constituents with 5% caustic soda solution but as alkali soluble constituents with 10% caustic soda solution. The entire distillate, however, boiling between around 220 and 255 or 265° C. can be advantageously employed without further refining or fractionation as a new butyl phenol composition which is free or substantially so from unchanged phenol and also free or substantially so from tarry impurities or constituents. The higher boiling and lower boiling constituents of this composite product, as well as the constituents of intermediate boiling point, form valuable ingredients of the new compositions, and the composition as a whole has a high phenol coefficient, for example, around 35 to 40.

The product can be further purified by treating it with caustic soda solution to extract the butyl phenols and convert them into their sodium salts, where caustic soda is employed for the extraction, and the resulting solution can be separated from undissolved constituents. Depending upon the strength of the caustic soda solution, a somewhat greater or smaller amount of phenols will be extracted. As pointed out above, a 10% caustic soda solution will extract phenols which will not be readily extracted with a 5% caustic soda solution. Such solutions of the sodium salts of the butyl phenols also form a valuable antiseptic or disinfecting composition and can be used as such or as an ingredient of compositions intended for antiseptic or disinfecting purposes. By treating the solution of the sodium salts with an acid such as hydrochloric acid or carbon dioxide, the butyl phenols can be set free from the sodium salts and the composition again obtained in the form of an oil which in this case will be free from alkali-insoluble constituents. It is not necessary to separate the alkali insoluble constituents for most purposes, but the composition containing such constituents can advantageously be employed. Such alkali-insoluble constituents if separated will be found to be relatively inert, although they may have a slight antiseptic action. The extracted phenols may be employed by themselves either in the form of their sodium salts, or in the form of the free phenols regenerated from the sodium salts. In such case, it is not necessary to further fractionate the oil to separate the higher and lower boiling constituents, but the composition as a whole can be advantageously employed, with its constituents boiling between 220° and 235° as well as its constituents boiling above 245° and up to 255° or 265° C.

The proportions of higher boiling, intermediate boiling and lower boiling constituents, will vary somewhat with the conditions of the condensing process. The yield will also vary somewhat with the process. I have obtained, for example, with different processes, from around ⅓ to nearly ½ of the total distillate boiling between 220° and 235° C. I have obtained similar variations in the part of the distillate boiling between 245° and 265° C. The portion of the oil distilling between 235° and 245° C. has varied from considerably less than half the total oil up to more than half. The fraction boiling between 235° and 245° C. undoubtedly contains considerable amounts of para-secondary butyl phenol, but it also contains considerable amounts of other phenols including ortho-secondary butyl phenol in substantial amounts, although the ortho-secondary butyl phenol will be largely present in the fraction boiling below 235° C. The fractionation of the oil for the purpose of separating any individual product is unnecessary, and the boiling points of certain of the butyl phenols are so close that it is extremely difficult to separate them from each other by fractional distillation. There is no need, however, of so separating them because they can advantageously be employed in admixture, and without separation, as a composite product having a high phenol coefficient. For example, the fraction boiling over the range of 235° to 250° C. has a phenol coefficient of about 38, while the total oil containing both higher and lower boiling constituents has a phenol coefficient approximately the same, varying, for example, from around 35 or somewhat lower to 40 or somewhat higher. By the use of proper apparatus and repeated distillations and crystallizations the para-secondary butyl phenol of boiling point of 240°–242° C. and melting point 60°–62° C. can be obtained, and also the ortho-secondary butyl phenol of boiling point 227° to 229° C.; but as above pointed out, there is no need of separating these individual phenols, or fractions consisting chiefly of them, because the composite product constitutes a valuable product of high phenol coefficient in much larger yields than would be the yield of the individual butyl phenols.

Ordinarily, where the crude product without further refining is not to be employed, a distillation of the crude product to remove unchanged phenol and tarry residue will be all that is needed; or the crude product can be subjected to alkali extraction, either before or after distillation, to separate the alkali-insoluble constituents from the alkali-soluble constituents, and these separated constituents can be employed separately for use as antiseptic or disinfecting compositions. When the crude product is purified by dissolving the butyl phenols in caustic alkali, separating the solution from the undissolved residue and acidifying the solution to set free the butyl phenol composition as an oil, this oil may be employed without further distillation, or it can then be distilled in case, for example, it still contains small amounts of unchanged phenol or of tarry residue which can be removed by distillation, giving a distillate boiling, for example, between 220° and 225° or 265° C.

*Example 2*

1000 parts of phenol and 700 parts of zinc chloride are heated together until solution is nearly complete. A solution of 900 parts of tertiary butyl alcohol and 150 parts of hydrochloric acid (35%) is added in portions while the temperature is held at 100°–130° C. The oil so obtained is washed with water and distilled, the distillate crystallizing on cooling. Crystallization from ligroin gives pure para tertiary butyl phenol.

*Example 3*

62 parts of guaiacol and 45 parts of zinc chloride are heated together until solution occurs. 10 parts of concentrated hydrochloric acid in 46 parts of tertiary hexyl alcohol (dimethyl-n-propyl carbinol) are added in several portions while the temperature is held at 100°–130° C. The resulting oil is purified by dissolving in twice its volume of benzene and extracting with several portions of dilute sodium hydroxide. The alkaline extracts are combined, acidified and the recovered phenolic material distilled. The product which distills over between 275° and 290° C. is collected as tertiary hexyl guaiacol. It is a new product.

*Example 4*

420 parts of phenol and 200 parts of zinc chloride are heated together until solution is almost complete. A solution of 40 parts of concentrated hydrochloric acid in 400 parts of cyclohexanol are added in portions while the temperature is held at 100°–130° C. The resulting oil is washed and distilled. The portion boiling from 250° to 300° C. is largely p-cyclohexyl phenol which can be crystallized from benzene or toluene. The corresponding ortho isomer can be obtained by fractionation of the mother liquor from the para isomer.

*Example 5*

225 parts of phenol and 200 parts of zinc chloride are heated until solution is nearly complete. A solution of 50 parts of concentrated hydrochloric acid in 225 parts of secondary butyl alcohol is added in portions while the temperature is held at 100°–140° C. The oil is washed with water and distilled. This product with a boiling point of about 220°–255° C. contains a small amount of non-phenolic material from which it may be freed by extraction of its alkaline solution with a suitable solvent.

*Example 6*

40 parts of phenol are mixed with 50 parts of tertiary amyl alcohol and 9 parts of concentrated sulphuric acid and the solution heated under a reflux condenser to about 65°–75° C. After one hour, nine parts more of acid are added slowly and the heating continued for three hours. The oil is washed with water and distilled. The tertiary amyl phenol which distills over may be purified by crystallization from a suitable solvent.

*Example 7*

3000 parts of cresol was heated with stirring to 130° when 2500 grams of zinc chloride was added slowly. A solution of 350 parts of concentrated hydrochloric acid in 2500 parts of secondary hexyl alcohol was added during three hours. Heating was continued two hours longer. The upper oil layer was collected, washed with water and distilled. The product coming over between 250° and 300° C. was taken as secondary hexyl cresol. This can be freed from the smaller amount of non-phenolic material by extraction with aqueous alkali.

*Example 8*

570 parts of U. S. P cresol and 1000 parts of zinc chloride are heated to 120° C. with stirring. A mixture of 165 parts of concentrated hydrochloric acid and 825 parts of n-butyl alcohol are added during two hours while the mixture is held at 110°–135° C. During the next three hours a mixture of 600 parts of n-butyl alcohol and 85 parts of concentrated hydrochloric acid are added. The lower aqueous layer is separated and the oil washed with water. The oil is then distilled. The product distilling between 240° and 263° C. is collected as secondary butyl cresol. It is a new product.

*Example 9*

500 parts of U. S. P. cresol and 500 parts of zinc chloride are heated with stirring to 120° C. 475 parts of secondary butyl alcohol containing 70 parts of concentrated hydrochloric acid is added during two hours while the temperature is maintained at 115–130° C. The lower aqueous layer is then separated; the oil washed with water and distilled, the product distilling between 235°–265° C., being collected as secondary butyl cresol. It is a new product.

*Example 10*

500 parts of meta cresol and 500 parts of zinc chloride are heated with stirring to 120° C. 475 parts of secondary butyl alcohol containing 70 parts of concentrated hydrochloric acid is added during two hours while the temperature is maintained at 115°–130° C. The lower aqueous layer is then separated; the oil washed with water and distilled, the product distilling between 241° and 255° C., being collected as secondary butyl meta cresol. It is a new product.

*Example 11*

365 parts of meta cresol is mixed with 340 parts of zinc chloride and heated to 130° C. 330 parts of mixed secondary amyl alcohols, containing 65 parts of concentrated hydrochloric acid, is added during two hours while the temperature is maintained at 120°–130° C. The temperature is held at 130° C. for two hours longer; after which the lower aqueous layer is removed and the oil washed with water. The product is distilled and the fraction coming over between 245°–260° C., collected as secondary amyl meta cresol. It is a new product.

*Example 12*

365 parts of U. S. P. cresol is mixed with 340 parts of zinc chloride and heated to 130° C. 330 parts of mixed secondary amyl alcohols, containing 72 parts of concentrated hydrochloric acid, is added during two hours while the temperature is maintained at 120°–130° C. The temperature is held at 130° C. for two hours longer, after which the lower aqueous layer is removed and the oil washed with water. The product is distilled and the fraction coming over between 245°–270° C. collected as secondary amyl cresol. It is a new product.

*Example 13*

337 parts of phenol and 337 parts of zinc chloride are mixed and heated with stirring to 125° C. 337 parts of mixed secondary amyl alcohols containing 68 parts of concentrated hydrochloric acid is added during five hours while the temperature is kept between 120° and 135° C. After heating one hour longer, the lower aqueous layer is removed and the oil washed with water. The oil is then distilled, the fraction coming over between 232° or 240° and 260° C., being collected as secondary amyl phenol. It is a new product.

*Example 14*

200 parts of phenol is mixed with 200 parts of zinc chloride and heated to 130° C. A mixture of 235 parts of secondary hexyl alcohol and 55 parts of concentrated hydrochloric acid is added during a period of three hours. The temperature is held at 120°–130° C. one hour longer. The lower aqueous layer is removed and the oil washed with water. The product is then distilled and the fraction coming over between 250° and 275° C., collected as secondary hexyl phenol. It is a new product.

*Example 15*

3000 parts of U. S. P. cresol is mixed with 2800 parts of zinc chloride. 3500 parts of secondary hexyl alcohol, containing 500 parts of concentrated hydrochloric acid, is added during three hours while the temperature is maintained at 120° to 135° C. After one hour longer heating and stirring, the lower aqueous layer is removed and the oil washed with water. The product is then distilled and that portion coming over between 250° and 300° C., or on distillation at 8 mm. that portion coming over at 140°–160° C. is collected as secondary hexyl cresol. It is a new product.

*Example 16*

300 parts of meta cresol is mixed with 300 parts of zinc chloride and heated to 125° C. 310 parts of secondary hexyl alcohol containing 50 parts of concentrated hydrochloric acid is added during two hours. The temperature is maintained at 120°–130° C. one hour longer while the mixture is stirred. The lower aqueous layer is then removed and the oil washed with water. The product is then distilled and that portion distilling between 260° and 290° or 300° C. is collected as secondary hexyl meta cresol. It is a new product.

*Example 17*

300 parts of ortho cresol is mixed with 300 parts of zinc chloride and heated to 125° C. 310 parts of secondary hexyl alcohol containing 50 parts of concentrated hydrochloric acid is added during two hours. The temperature is maintained at 120°–130° C. one hour longer while the mixture is stirred. The lower aqueous layer is then removed and the oil washed with water. The product is then distilled and that portion distilling between 250°–270° or 275° C. is collected as secondary hexyl ortho cresol. It is a new product.

*Example 18*

300 parts of para cresol is mixed with 300 parts of zinc chloride and heated to 125° C. 310 parts of secondary hexyl alcohol containing 50 parts of concentrated hydrochloric acid is added during two hours. The temperature is maintained at 120°–130° C. one hour longer while the mixture is stirred. The lower aqueous layer is then removed and the oil washed with water. The product is then distilled and that portion distilling between 265° and 290° or 300° C. is collected as secondary hexyl para cresol. It is a new product.

*Example 19*

500 parts of U. S. P. cresol is mixed with 325 parts of zinc chloride and heated to 120°–130° C. 500 parts of tertiary amyl alcohol containing 100 parts of concentrated hydrochloric acid is added during two hours while the temperature is held at 100°–130° C. or as near 100° as refluxing permits. The mixture is then heated one hour longer with stirring. The lower aqueous layer is then removed; the oil washed with water. The product is distilled and fraction coming over between 240° and 260° or 265° C. is collected as tertiary amyl cresol. It is a new product.

It is understood, of course, that the relative amounts of each ingredient used in the examples above may be varied over considerable limits, affecting only the yield.

The amyl and hexyl alcohols used were mixtures of the secondary alcohols available commercially. The use of any individual alcohol isomer would result in the production of the same mixture of phenols, differing only in the relative amounts of each phenolic isomer. U. S. P. cresol has been used as a typical commercially available mixture of the three cresols. Since this mixture may vary over wide limits in regard to the relative amounts of each isomer present, so the product obtained from such a mixture of cresols will contain varying amounts of the derivatives of the isomeric cresols somewhat in proportion to the amounts of each isomer present in the mixed cresols used.

The use of n-amyl or n-hexyl alcohol in place of the secondary alcohols would also lead to products differing but slightly, if at all, from those obtained from secondary alcohols.

The compound prepared as described in Example 1 is claimed as a new product in United States Patent No. 1,887,662, issued November 15, 1932 on my application Serial No. 258,151, filed February 29, 1928, which was copending with my application Serial No. 637,199 (now United States Patent No. 2,242,325, issued May 20, 1941) and of which said application Serial No. 637,199 is in part a continuation.

The reaction employing zinc chloride as a condensing agent in the presence of an acid may be applied generally to the condensation of alcohols with phenols. In this manner, the following new compounds have been prepared:

|  | ° C. |
|---|---|
| Secondary heptyl phenol boiling around | 255-275 |
| Tertiary hexyl cresol boiling around | 250-260 |
| Secondary butyl guaiacol boiling around | 245-270 |
| Secondary amyl guaiacol boiling around | 250-268 |
| Secondary hexyl guaiacol boiling around | 255-275 |
| Cyclo hexyl guaiacol boiling around | 300-308 |

The new alkyl phenols are active germicides varying considerably in activity ranging from compounds having a phenol coefficient of about 15, to compounds having a phenol coefficient of nearly 200. They have a wide field of usefulness.

Alkyl phenols may be incorporated into soap solutions to produce antiseptic solutions which may be used full strength or diluted. They may be used to increase the activity of soap solutions containing phenol or cresol which already have antiseptic properties, for example, the addition of from 1% to 10% of an akyl phenol such as a mixture of secondary hexyl cresols, for example, to a solution containing 35% of soap and 50% of a mixture of cresols and 5% of water and glycerin will give an antiseptic solution very much more active than the same solution without the addition of the alkyl phenol. Also a solution containing about 7 of soap, 6% of a mixture of cresols and 6% of a mixture of secondary hexyl cresols or other alkyl phenols, the balance being water is an antiseptic and may be used full strength or diluted with large amounts of water, as desired. In antiseptic soap solutions of this type, I prefer to use a linseed oil soap solution, although cocoanut oil or other fatty oils may be used as a basis for the soap instead of linseed oil, if desired. The amounts of cresol used may vary over wide limits. A mixture of the cresol isomers and the hexyl cresol isomers or a single cresol and hexyl cresol isomer may be employed. The resulting solutions upon dilution give more or less permanent emulsions depending upon the relative amounts of each ingredient present. Small amounts of other solvents may be added such as alcohol, acetone, ethylene glycol or an ethylene glycol ether, or diethylene glycol or a diethylene glycol ether.

Certain of the alkyl phenols may be taken internally and may be employed as urinary antiseptics. The effect of such antiseptics depends somewhat upon the diet of the animal under consideration. They may be administered as an oil solution inclosed in a gelatin capsule. A mixture of the secondary hexyl cresols exerts an anthelmintic action in addition to its antiseptic action and is to be recommended for treatment of the intestinal and urinary tracts. In general, the higher members of any series of alkyl phenols are less toxic and less escharotic than the lower. The secondary hexyl cresols and phenols, secondary amyl cresols and phenols and secondary butyl cresols and phenols are markedly antiseptic and relatively non-toxic. The secondary hexyl, amyl and butyl cresols have no appreciable escharotic action. They may be incorporated in oils such as olive or cottonseed oil for this purpose and if desired, such solutions may be administered in elastic gelatin capsules.

Most of the alkyl phenols are relatively insoluble in water but all may be dissolved in alcohol or alcohol and water with or without the addition of other diluents such as glycol, glycerin, etc. and such deodorant solutions may be employed as oral antiseptics or general antiseptics. For example, a 30% alcohol solution containing, for example, about one part in 1,000 of these alkyl phenols has marked antiseptic properties. Moreover, a mixture of two or more phenols usually has a greater activity than would be expected for the activity of each individual. For this reason, the alkyl phenols are useful additions to other phenolic germicides incorporated in such solvents as those last mentioned. As an example, tertiary amyl phenol added to a solution of another phenol, for example phenol in one of the solvents mentioned above gives a solution more active than would be anticipated from the action of tertiary amyl phenol or phenol alone.

The alkyl phenols may be incorporated into jellies and ointments which also include a solvent for both phenol and water, for example jellies prepared from such materials as tragacanth, acacia, etc. and containing glycerin, alcohol, ethylene glycol or like solvents may be given antiseptic properties by the incorporation of small amounts of alkyl phenols. For example, a semi-fluid jelly prepared from tragacanth and acacia containing from 10% to 25% glycerin and from about 1 to 500 to 1 to 2,000 parts, more or less, of secondary hexyl cresol or secondary amyl phenol has antiseptic properties.

The alkyl phenols may be incorporated in petrolatum base ointments, particularly if a second ingredient soluble in both oils and water such as dioxan, lanolin and the ethers of ethylene and diethylene glycol is added for the purpose of assisting the extraction of the phenol from the ointment base by surrounding aqueous fluids.

The alkyl phenols which are comparatively non-toxic are strongly antiseptic and may advantageously be used in small amounts for the preservation of cosmetics, powders, jellies and food products in general, particularly those not containing large amounts of nitrogenous materials.

This application is a division of my copending application Serial No. 637,199, filed October 10, 1932, United States Patent No. 2,242,325.

I claim:

1. Germicidal compositions containing in an effective germicidal concentration a mixture of alkyl phenols having an alkyl phenol with five to seven carbon atoms in said alkyl group.

2. Germicidal compositions containing in an effective germicidal concentration a mixture of isomeric alkyl phenols having an alkyl phenol with 5 to 7 carbon atoms in said alkyl group.

ROLAND R. READ.